(12) United States Patent
Tatsubori

(10) Patent No.: US 8,150,910 B2
(45) Date of Patent: Apr. 3, 2012

(54) SERVICE PROVIDING DEVICE, PROGRAM, METHOD, AND SYSTEM

(75) Inventor: Michiaki Tatsubori, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 12/497,746

(22) Filed: Jul. 6, 2009

(65) Prior Publication Data

US 2010/0011105 A1 Jan. 14, 2010

(30) Foreign Application Priority Data

Jul. 7, 2008 (JP) ................................. 2008-177411

(51) Int. Cl.
*G06F 15/16* (2006.01)
*G06Q 30/00* (2006.01)
(52) U.S. Cl. ..................................... 709/203; 705/14.49
(58) Field of Classification Search .................. 709/203; 705/14.49
See application file for complete search history.

(56) References Cited

U.S. PATENT DOCUMENTS

| | | | |
|---|---|---|---|
| 6,519,571 B1 * | 2/2003 | Guheen et al. ............. | 705/14.66 |
| 6,847,969 B1 * | 1/2005 | Mathai et al. ........................ | 1/1 |
| 6,868,433 B1 * | 3/2005 | Philyaw ........................ | 709/203 |
| 7,188,085 B2 * | 3/2007 | Pelletier ........................... | 705/50 |
| 7,630,986 B1 * | 12/2009 | Herz et al. ............................. | 1/1 |
| 2001/0049635 A1 * | 12/2001 | Chung ............................. | 705/26 |
| 2002/0103703 A1 * | 8/2002 | Spetalnick ..................... | 705/14 |
| 2003/0006911 A1 * | 1/2003 | Smith et al. ................... | 340/988 |
| 2004/0122730 A1 * | 6/2004 | Tucciarone et al. ............ | 705/14 |
| 2004/0167928 A1 * | 8/2004 | Anderson et al. .......... | 707/104.1 |
| 2011/0010242 A1 * | 1/2011 | Blaser et al. .............. | 705/14.49 |

OTHER PUBLICATIONS

M. Rappa, "Business Models on the Web," [online], [searched on Jun. 16, 2008], the Internet <URL: http://digitalenterprise.org/models/models.html>.

* cited by examiner

*Primary Examiner* — Asghar Bilgrami
(74) *Attorney, Agent, or Firm* — Vazken Alexanian

(57) ABSTRACT

A service providing device, program, method and system. The service providing device receives, from the different service providing device, an additional information piece including at least one of: (i) advertising information to be provided to a user of the different service, and (ii) a terms of use agreement for the different service. This allows the service providing device to output or provide, to the user, advertising information and/or terms of use agreement associated with the different service, simultaneously with providing a separate new service by using the different service.

16 Claims, 9 Drawing Sheets

```
<?xml version="1.0"?>
<wsdl:definitions name="SpotAddressSearchService">
    xmlms:wsdl="http://schemas.xmlsoap.org/wsdl"
    xmlms:wsp="http://schemas.xmlsoap.org/ws/2002/12/policy"
    targetNamespace="http://sass.com/search/wsdl"
    ...
    xmlns:ps="http://saas.com/policies">
  <wsp:UsingPolicy wsdl:Required="true" />
    ...
  <wsdl:operation name+'Lookup" wsp:PolicyRefs="ps:P1">
    ...
  </wsdl:operation>
</wsdl:definitions>
```
                                                                  A

FIG. 4

```
<?xml version="1.0"?>
<wsdl:Policy xmlns:wsp="http://schemas.xmlsoap.org/ws/2002/12/policy"
    xmlms:sula-ad="uri:sula-ad">
  <ads:Advertisement smlns="uri:ads">
    <ads:IMageContent ref+"http://www.company.com/adsl"
        link="http://www.company.com">
    <ads:PixelSize width="200" height="100" />
  </ads:Advertisement>
</wsp:Policy>
```

FIG. 5

SERVICE PROVIDING DEVICE, PROGRAM, METHOD, AND SYSTEM

CROSS-REFERENCE TO RELATED APPLICATIONS

This application claims priority under 35 U.S.C. §119 from Japanese Patent Application No. 2008-177411 filed Jul. 7, 2008, the entire contents of which are incorporated herein by reference.

BACKGROUND OF THE INVENTION

1. Field of the Invention

The present invention relates to a service providing device, program, method and system. Particularly, the present invention relates to a service providing device, program, method and system for processing a service upon receipt of a processing request for the service, and for transmitting back a processing result of the service to a request source.

2. Description of the Related Art

In providing a Web service, it is conceivable to use a processing result provided by a different Web service. For example, consider the case of providing a Web service to display a transfer guide from a spot corresponding to an inputted current spot name, for example a famous building's name, to a spot corresponding to an inputted destination spot name. Hereinafter, such a Web service will be referred to as between-spot transfer guide service. In this case, the between-spot transfer guide service can be provided by using processing results of the following: (i) a Web service, hereinafter referred to as address search service, to search for an address with a spot name; (ii) a Web service, hereinafter referred to as nearest station search service, to search for the nearest station with an address; and (iii) a Web service, hereinafter referred to as transfer guide service, to compute transfer guide information from two stations' names.

Known Web services charge money or the like as a usage fee for the Web service. The use of such a Web service requires paying money or the like and thus a Web service using a processing result of a different Web service of that kind can be provided by paying for the different Web service. For example, assume that the usage fee for the address search is 1 yen per service, the usage fee for the nearest station search service is 1 yen per service, and the usage fee for the transfer guide service is 2 yen per service. In this case, the provider of the between-spot transfer guide service using these services needs to receive a usage fee of not less than 4 yen per service from users of the between-spot transfer guide service. Alternatively, the provider of the between-spot transfer guide service may receive an advertisement fee of not less than 4 yen per service from an advertiser and provide the between-spot transfer guide service to its users for free while simultaneously presenting advertising information.

However, collecting small charges is troublesome. Moreover, the use of such a Web service that charges money is inconvenient since the Web service of this kind requires pre-registration or the like from users. In addition, just the fact that a service charges money or the like sometimes discourages the use of the service. See M. Rappa, "Business Models on the Web," [online], [searched on Jun. 16, 2008], the Internet <URL: http://digitalenterprise.org/models/models.html>, for example.

Meanwhile, another known Web service is provided to users for free by displaying an advertisement on part of the Web page. In some cases, a Web service displays on part of a Web page, or the like, a terms of use agreement for a processing result of the service so as to set limits on the use of the processing result of the service.

However, if a Web service is provided by using a processing result of a different Web service of that kind, an advertisement and a terms of use agreement on a Web page provided by the used Web service is not displayed on a Web page provided by the user Web service. Thus, in that case, the provider of the used Web service cannot obtain an appropriate benefit and a processing result of the service may be used in a way that the provider does not desire.

In view of the aforementioned circumstances, an object of the present invention is to provide a service providing device, program, method and system capable of solving the above problems. The object is achieved through the combination of the features described in the following specification and the claims.

SUMMARY OF INVENTION

A first aspect of the present invention provides a device for providing a service. Specifically, the service providing device includes: a request receiving unit, a processing unit, a request transmitting unit, a response receiving unit, an additional information receiving unit, a response transmitting unit and an additional information transmitting unit. The request receiving unit receives a processing request message for the service. The processing unit processes the service according to the processing request message. During the processing of the service, the request transmitting unit transmits a different processing request message for a different service to a different service providing device. Here, the different service is used by the service to be provided to the service request source. The response receiving unit receives a processing result of the different service from the different service providing device. The additional information receiving unit receives, from the different service providing device, an additional information piece including at least one of: (i) advertising information to be provided to a user of the different service and (ii) a terms of use agreement for the different service. The response transmitting unit transmits back the processing result of the service to the service request source. The additional information transmitting unit transmits, to the service request source, the additional information piece received from the different service providing device.

As described above, the service providing device according to the first aspect of the present invention receives, from the different service providing device, an additional information piece including at least one of: advertising information to be provided to a user of the different service, and a "terms of use" agreement for the different service. This allows the service providing device according to the first aspect of the present invention to appropriately output or provide, to the user, advertising information and/or a terms of use agreement associated with a different service, simultaneously with providing a separate new service by using the different service.

A second aspect of the present invention provides a method for providing a service by a service providing device. The method includes the steps of: receiving, by a request receiving unit, a processing request message for the service from a service request source computer; processing, by a processing unit, the service according to the processing request message; transmitting, by a request transmitting unit, a different processing request message for a different service to a different service providing device, wherein the transmitting is during the processing of the service by the processing unit and wherein the different service is used by the service to be provided to the service request source; receiving, by a response receiving unit, a processing result of the different service from the different service providing device; receiving, by an additional information receiving unit and from the different service providing device, an additional information piece including at least one of: (i) advertising information to be provided to a user of the different service, and (ii) a terms of use agreement for the different service; transmitting, by a response transmitting unit, back the processing result of the service to the service request source; and transmitting, by an additional information transmitting unit and to the service request source, the additional information piece received from the different service providing device.

A third aspect of the present invention provides a service providing system including a first service providing device and a second service providing device. The first service providing device processes a first service upon receipt of a processing request for the first service, and transmits back a processing result of the service to a request source. The second service providing device requests the first service providing device to process the first service, while processing a second service which uses the first service, if the second service providing device receives a processing request for the second service. More specifically, the first service providing device transmits, to the second service providing device, an advertising information piece to be provided to a user of the first service. The second service providing device provides a user of the second service with the advertising information piece related to the first service and received from the first service providing device.

In the service providing system according to the third aspect of the present invention, the first service providing device transmits, to the second service providing device, an advertising information piece to be provided to a user of the first service. In addition, the second service providing device provides a user of the second service with the advertising information piece related to the first service and received from the first service providing device. This allows the service providing system according to the second aspect of the present invention to provide a new service by appropriately using a different service and, at the same time, to provide, to a provider of the new service, an advertising information piece to be provided to a user of a different service.

A fourth aspect of the present invention provides a computer program product embodying computer readable code which, when executed, causes a computer to provide a service according to the steps of the above method.

BRIEF DESCRIPTION OF THE DRAWINGS

FIG. 4 shows an example of Web service specifications described in WSDL.

FIG. 5 shows an example description of a terms of use agreement.

DETAILED DESCRIPTION OF THE PREFERRED EMBODIMENTS

The present invention is first described by the following embodiment.

Figure 1:
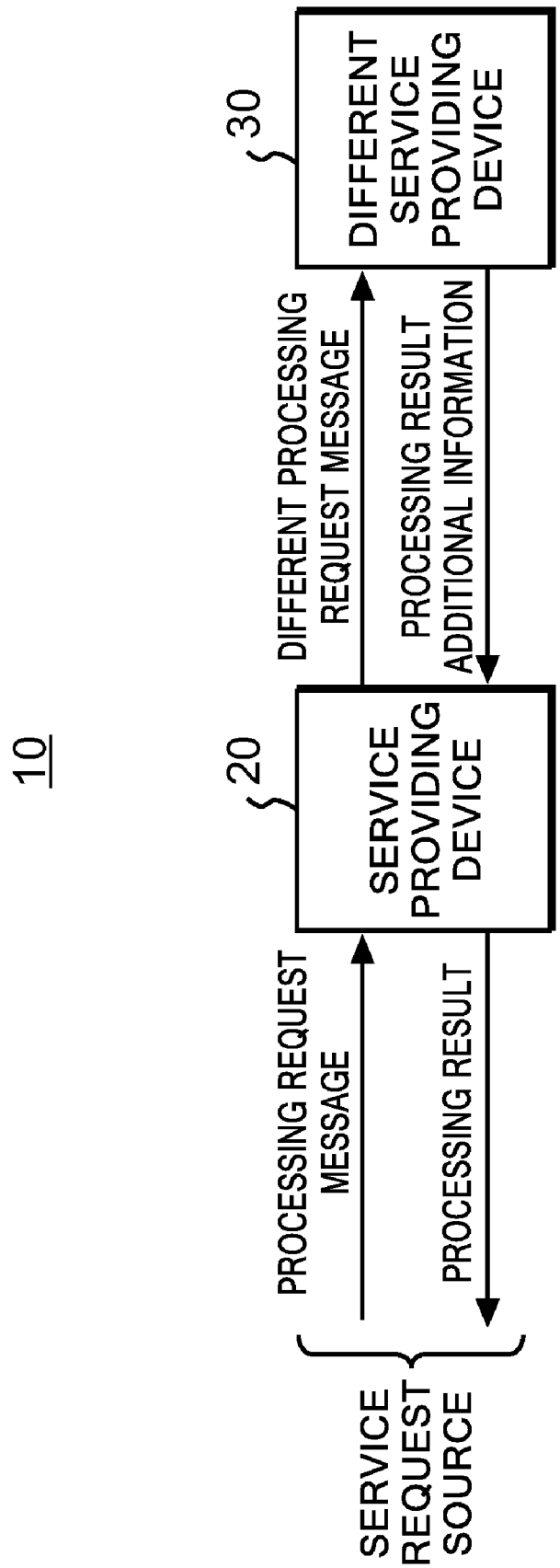
FIG. 1 shows an example of a configuration of a service providing system according to an embodiment of the present invention.

FIG. 1 shows an example of a configuration of a service providing system 10 according to this embodiment. The service providing system 10 includes a service providing device 20 and one or more different service providing devices 30.

The service providing device 20 receives a processing request message to request the processing of a service from a service request source such as a service user's terminal, a server system, or the like. Upon receipt of the processing request message, the service providing device 20 processes the service and transmits back a processing result to the service request source.

During the processing of the service, the service providing device 20 needs at least one different service as at least part of the service. Thus, during the processing, the service providing device 20 transmits a different processing request message to request the processing of the different service to a different service providing device 30 that provides the different service. Then, the service providing device 20 receives a processing result of the different service from the different service providing device 30 and uses the result in the processing of the service to be provided by the service providing device 20. For example, in requesting to process multiple different services, the service providing device 20 may transmit multiple different processing request messages to different service providing devices 30 that provide these different services, respectively, and receive processing results from the respective different service providing devices 30.

The different service providing devices 30 each receive a different processing request message to request the processing of a different service from the service providing device 20. Upon receipt of the different processing request message, the different service providing device 30 processes the different service and transmits back a processing result to the service providing device 20. For example, in processing the different service, the different service providing device 30 may request another different service providing device to process another different service, receive a processing result therefrom, and use the result in the processing of the different service to be provided by the different service providing device 30. In addition, the different service providing device 30 may also transmit back to the service providing device 20 an additional information piece such as advertising information and/or a terms of use agreement together with the processing result.

The service providing device 20 and the different service providing devices 30, as described above, can each be implemented by a computer that operates by executing a program. For example, each of the service providing device 20 and the different service providing devices 30 may be a server system to provide a Web service through a network or the like.

Figure 2:
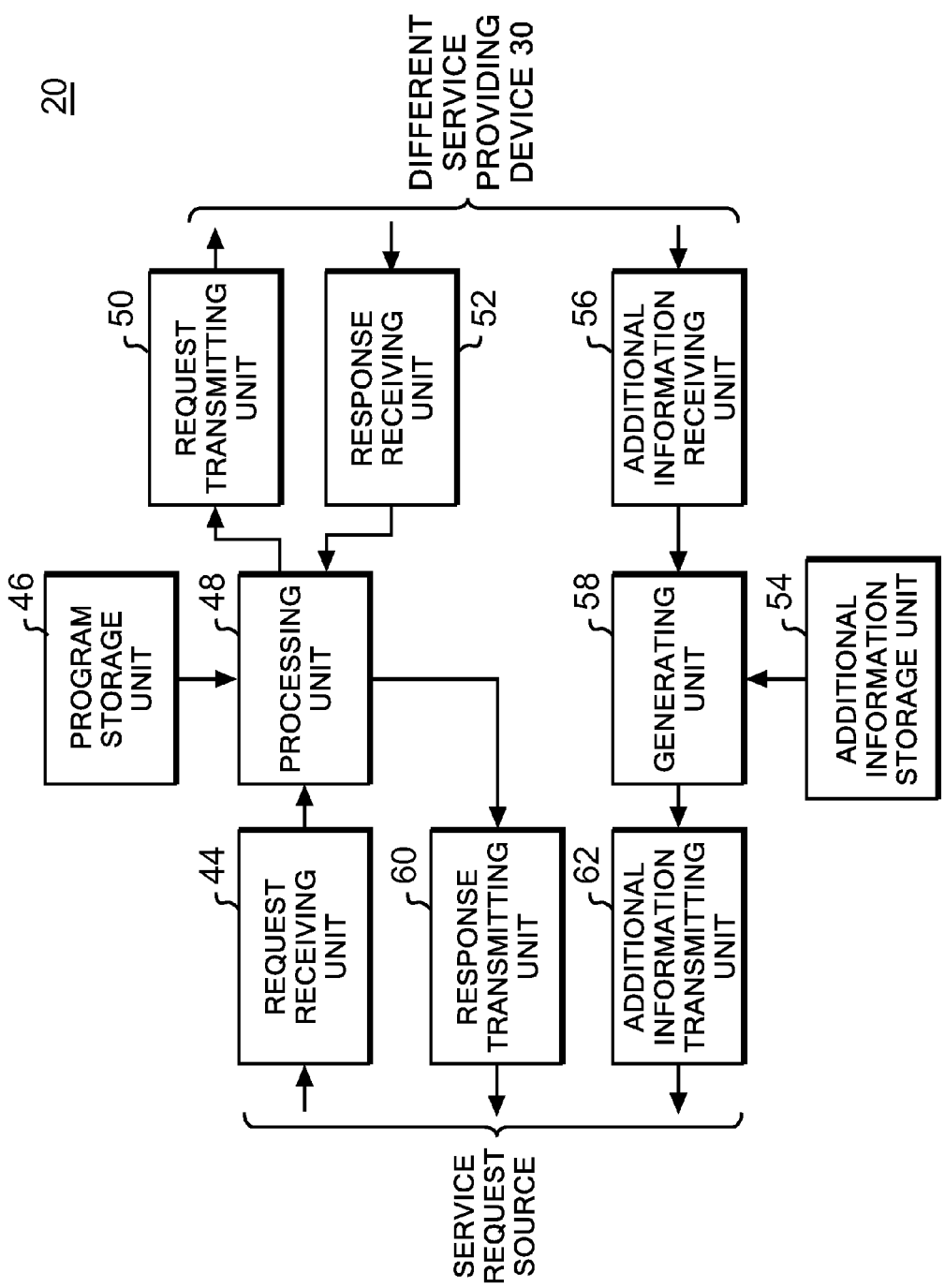
FIG. 2 shows a configuration of a service providing device according to the embodiment of the present invention.

FIG. 2 shows a configuration of the service providing device 20 according to this embodiment. Note that each different service providing device 30 may have a similar configuration to that of the service providing device 20.

The service providing device 20 includes a request receiving unit 44, a program storage unit 46, a processing unit 48, a request transmitting unit 50, a response receiving unit 52, an additional information storage unit 54, an additional information receiving unit 56, a generating unit 58, a response transmitting unit 60 and an additional information transmitting unit 62.

The request receiving unit 44 receives a processing request message for a service from a service request source. The program storage unit 46 stores therein service providing programs for processing services.

The processing unit 48 processes a service corresponding to a processing request message received by the request receiving unit 44. Specifically, the processing unit 48 reads out, from the program storage unit 46, a service providing program for processing the service specified by the processing request message and then executes the program.

While the processing unit 48 processes a service, the service needs to use one or more different services. Thus, the request transmitting unit 50 transmits one or more different processing request messages for these different services to the different service providing devices 30 that process the different services, respectively. Specifically, if the processing unit 48 executes a calling process in a service providing program to call a different service, then the request transmitting unit 50 transmits the corresponding different processing request message to the corresponding different service providing device 30 in response.

The response receiving unit 52 receives, from one or more different service providing devices 30, processing results of the one or more different services corresponding to the one or more different processing request messages transmitted by the service providing device 20, respectively. Then, the response receiving unit 52 gives the received processing results of the different services to the processing unit 48. This allows the processing unit 48 to process a service to be provided by the service providing device 20 by using the processing results of the different services.

The additional information storage unit 54 stores therein an additional information piece on the service providing device 20. The additional information piece consists of at least one of advertising information and a terms of use agreement. The advertising information includes at least one advertising information piece that the service providing device 20 provides to the users and the terms of use agreement includes at least one term of use for a service provided by the service providing device 20. Here, the advertising information may be data such as text data, still image data, video image data or sound data. Alternatively, the advertising information may be data to link to a still image, a video image or the like.

The terms of use agreement specifies one or more terms under which the concerned service is allowed to be used. The terms of use agreement may be terms specifying what Web to provide with a processing result of the service. Specifically, the terms of use agreement may specify that any processing result of the service should not be provided to such a site that offends public order and morals, or specify that any processing result of the service should not be provided to a commercial site, for example. Alternatively, the terms of use agreement may specify age requirements for users of terminals to be provided with any processing result of the service.

In addition, the terms of use agreement may include output conditions under which the concerned advertising information is outputted to the service users' terminals. For example, the output conditions may include at least one of: (i) conditions which respectively specify a position, a size, a time and a frequency of displaying the advertising information on the service users' terminals as an image; and (ii) conditions which respectively specify a time, a sound volume and a frequency of outputting the advertising information to the service users' terminals as a sound.

Specifically, the output conditions may include: (i) the condition that the advertising information be displayed on an upper or center portion of a screen; (ii) the condition specifying the numbers of vertical and horizontal pixels of the advertising information; and/or (iii) the condition that the advertising information be displayed more than one out of every ten times a user uses the service, for example.

Optionally, the output conditions may include: (i) the condition that the advertising information be outputted for 20 seconds or more; and/or (ii) the condition that the advertising information be outputted for 20 seconds or more on a best-effort basis, for example.

Optionally, the output conditions may include the condition specifying which different advertising information to provide in combination with the concerned advertising information. For example, the output conditions may include: (i) the condition that no advertising information from competitors be outputted with the concerned advertising information; and/or (ii) the condition that no advertising information unsuitable for combined provision with the concerned advertising information be outputted with the concerned advertising information. For example, advertising information on a stomach medicine if the concerned advertising information is for a food product. Conversely, the output conditions may include the condition that advertising information suitable for combined provision with the concerned advertising information be outputted with the concerned advertising information. For example, advertising information on an appetizer if the concerned advertising information is for beer.

For each of one or more different services to be processed according to the respective different processing request messages, the additional information receiving unit 56 receives from the corresponding different service providing device 30 the additional information piece on the different service providing device 30. The additional information piece on each different service providing device 30 may consist of at least one of advertising information and a terms of use agreement. The advertising information includes at least one advertising information piece to be provided to the users of the concerned different service and the terms of use agreement includes at least one term of use for a different service provided by the service providing device 20.

Note that the additional information receiving unit 56 may obtain terms of use agreements from the one or more different service providing devices 30 before the processing of its own service. That is, it may obtain the terms of use agreements from different service providing devices before the receipt of the processing request message for the service, the processing of the service, and the return transmission of a processing result of the service. The additional information receiving unit 56 may obtain a terms of use agreement included in web service description language (WSDL) description, for example, described later are terms of use agreements shown in FIGS. 4 and 5. This allows the additional information receiving unit 56 to previously determine which different service providing device 30 demands terms of use unacceptable to the service providing device 20 and to avoid using any service provided by such a different service providing device 30.

The generating unit 58 generates merged additional information by merging the additional information pieces on the different service providing devices 30 received by the additional information receiving unit 56 and the additional information piece on the service providing device 20 read out from the additional information storage unit 54. For example, the generating unit 58 may generate screen data for displaying a screen including the merged additional information on the concerned service user's terminal. Specifically, the generating unit 58 may generate screen data for outputting, to the terminal, all the advertising information pieces, that is, the advertising information pieces received from the different service providing devices 30 and the advertising information piece stored in the additional information storage unit 54, in a manner that each advertising information piece is outputted under the corresponding output condition.

Optionally, the generating unit 58 generates a merged terms of use agreement by merging the terms of use agreement for the service provided by the service providing device 20 stored in the additional information storage unit 54 and the terms of use agreements for the different services provided by the different service providing devices 30 and received by the additional information receiving unit 56 from the different service providing devices 30, respectively. If the additional information receiving unit 56 obtains terms of use agreements from the different service providing devices 30 before the processing of its own service, the generating unit 58 may generate the merged terms of use agreement before the processing of its own service.

The response transmitting unit 60 transmits back, to the service request source, a processing result of the service processed by the processing unit 48. The additional information transmitting unit 62 transmits the merged additional information to the service request source. For example, the additional information transmitting unit 62 transmits back, to the service request source, the screen data and the merged terms of use agreement generated by the generating unit 58. Note that the response transmitting unit 60 may transmit back the screen data generated by the generating unit 58 either as part of a screen on which a processing result of the service is displayed or as a separate screen from this screen.

Figure 3:
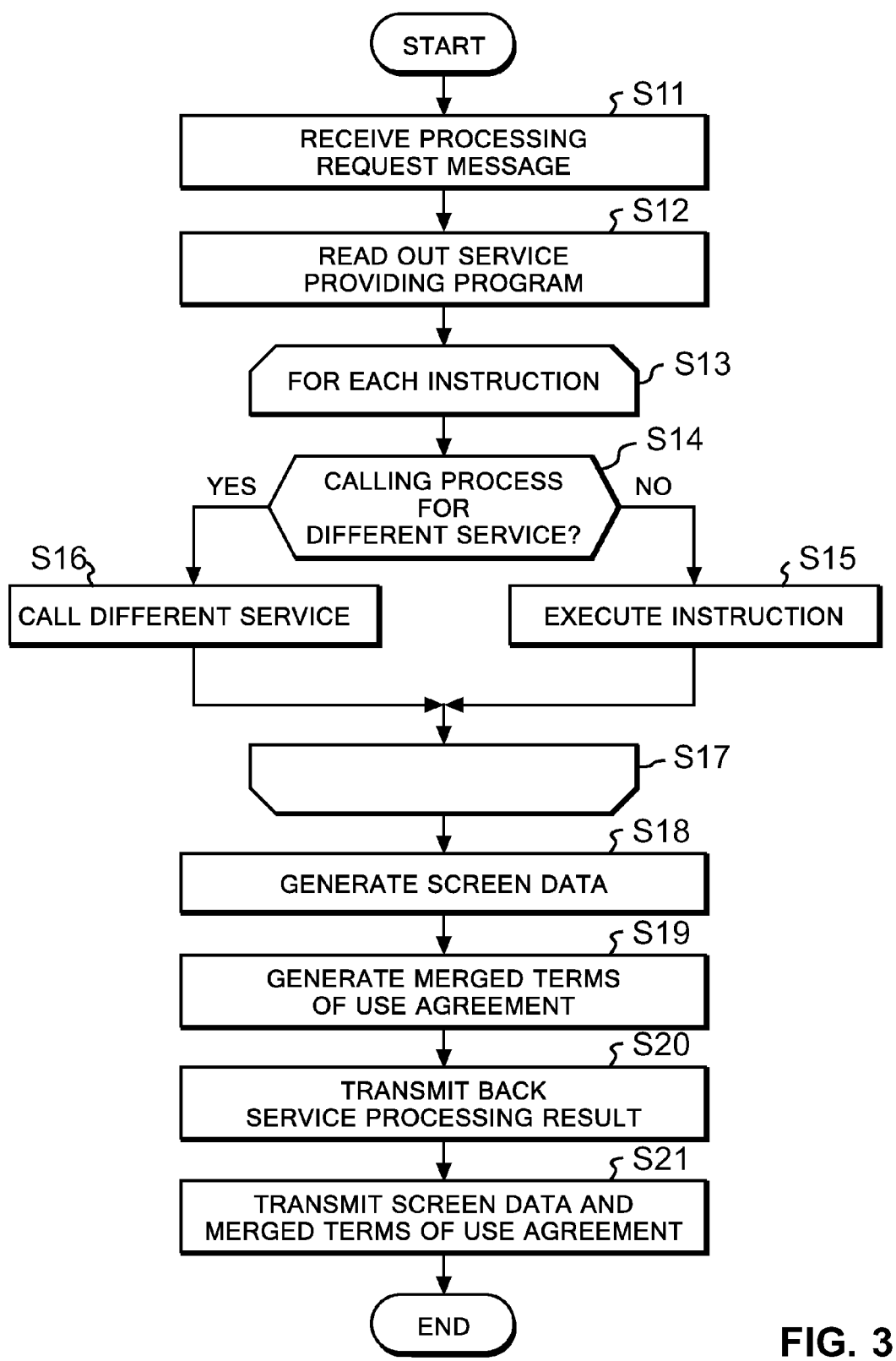
FIG. 3 shows a processing flow performed by the service providing device according to the embodiment of the present invention.

FIG. 3 shows a processing flow performed by the service providing device 20 according to this embodiment. For example, a service provided by the service providing device 20 may be a Web service, but is not limited to a Web service. The service providing device 20 may provide other program processing services.

Firstly, the request receiving unit 44 receives a processing request message for a service from a service request source (step S11). The processing request message may be a simple object access protocol (SOAP) message to request to process a Web service, for example. Then, the processing unit 48 reads out, from the program storage unit 46, a service providing program specified by the processing request message (step S12).

Thereafter, the processing unit 48 executes the process of steps S14 to S16 for each instruction in the service providing program (steps S13 and S17). In step S14, the processing unit 48 determines whether or not the current instruction describes a calling process to call a different service. If the instruction does not describe a calling process (No in step S14), the processing unit 48 executes the instruction (step S15).

If the current instruction describes a calling process (Yes in step S14), the processing unit 48 calls a different service specified by the current instruction (step S16). Specifically, the processing unit 48 causes the request transmitting unit 50 to transmit a different processing request message specified by the instruction and is given a processing result of the different service received by the response receiving unit 52.

In addition, in step S16, the additional information receiving unit 56 receives advertising information and/or terms of use agreement provided by the corresponding different service providing device 30.

After completing the processing of the service by using the service providing program, the generating unit 58 generates screen data for outputting to the service user's terminal the advertising information pieces received from one or more different service providing devices 30 and the advertising information piece stored in the additional information storage unit 54 under the respective corresponding output conditions (step S18).

Subsequently, the generating unit 58 generates a merged terms of use agreement by merging: (i) the terms of use agreement for the service provided by the service providing device 20 and stored in the additional information storage unit 54; and (ii) terms of use agreements for different services provided by one or more different service providing devices 30 and received by the additional information receiving unit 56 from the different service providing devices 30, respectively (step S19). Note that, if each terms of use agreement includes one or more terms, the generating unit 58 may include in the merged terms of use agreement all the terms included in at least one of the terms of use agreements for the different services and the service provided by the service providing device 20. In such an event, any overlapping terms between two or more of the terms of use agreements may be united into one term in the merged terms of use agreement. If the additional information receiving unit 56 obtains terms of use agreements from the different service providing devices 30 before the processing of its own service, the generating unit 58 may perform the process to generate the merged terms of use agreement in step S19 and store a performance result of the process, before the current processing flow. In this case, the generating unit 58 may read out the previously-generated merged terms of use agreement in step S19.

Then, the response transmitting unit 60 transmits back, to the service request source, the processing result of the service performed by the processing unit 48 (step S20). Thereafter, the additional information transmitting unit 62 transmits back, to the service request source, the screen data and the merged terms of use agreement generated by the generating unit 58 (step S21).

The service providing device 20 as described above can provide the following information simultaneously with providing a separate new service by using processing results of one or more different services. Specifically, the service providing device 20 can simultaneously provide users of the new service with advertising information to be provided with the different services. Optionally, the service providing device 20 can simultaneously provide the users of the new service with the merged terms of use agreement in which the terms of use agreements for the different services and the terms of use agreement for the new service are merged. Accordingly, the service providing device 20 as described above can provide appropriate benefits to the providers of different services even when providing a separate new service by using processing results of the different services.

FIG. 4 shows an example of Web service specifications described in WSDL. The service providing device 20 according to this embodiment may provide the terms of use agreement for a service by publishing it as meta-information of the service. If processing request messages are SOAP messages, the terms of use agreement may be added as part of a policy to the Web service specifications described in WSDL, for example. In addition, the terms of use agreement may be managed by a special service for managing meta-information of the services.

The designation "A" in FIG. 4 shows an example of a terms of use agreement. Specifically, this designation represents a link to a file containing the terms of use agreement for the concerned Web service. As shown in FIG. 4, the terms of use agreement may be included in Web service specifications described in WSDL.

FIG. 5 shows an example of terms of use agreement. For example, the terms of use agreement can be described according to Web Services Policy Framework (WS-policy), as shown in FIG. 5. The terms of use agreement shown in FIG. 5 specifies the condition that image data stored in a place represented by the link be displayed in 200 pixels wide by 100 pixels long.

Figure 6:
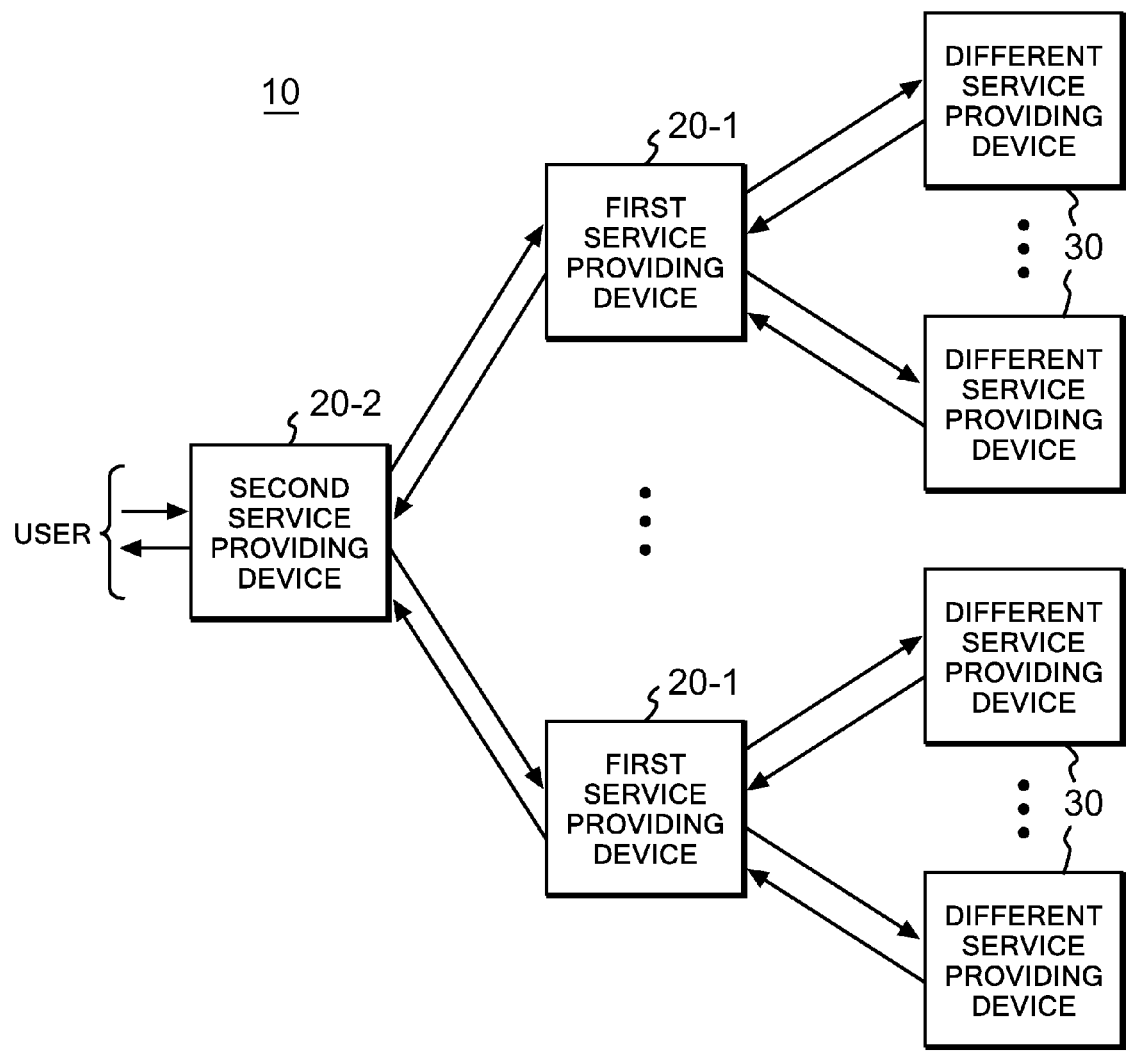
FIG. 6 shows another example of a configuration of the service providing system according to the embodiment of the present invention.

FIG. 6 shows an example of a configuration of the service providing system 10 according to this embodiment. The service providing system 10 according to this embodiment may have a configuration allowing a separate service providing device to use a service provided by the service providing device 20. Specifically, the service providing system 10 may include one or more first service providing devices 20-1, a second service providing device 20-2 and one or more different service providing devices 30, as shown in FIG. 6.

Upon receipt of a processing request message for a first service, each of the one or more first service providing devices 20-1 processes the first service and transmits back a processing result to the request source. During the processing of the first service, the first service needs to use one or more different services. Thus, during the processing, each of the one or more first service providing devices 20-1 requests different service providing devices 30 that provide these different services to process the different services.

Upon receiving a processing request message for a second service from a second service user, the second service providing device 20-2 processes the second service and transmits back a processing result to the request source. During the processing of the second service, the second service needs to use the first service. Thus, upon receipt of a processing request message for the second service using the first service, the second service providing device 20-2 requests, while processing, the first service providing devices 20-1 to process the first service.

In addition, each of the one or more first service providing devices 20-1 transmits to the second service providing device 20-2: (i) advertising information pieces that are respectively received from the different service providing devices 30 and to be provided to users of the different services; and (ii) an advertising information piece related to the corresponding first service, in other words, the advertising information piece to be provided to users of the first service by the first service providing device 20-1. Then, the second service providing device 20-2 transmits, to the second service user, advertising information pieces that are related respectively to the different services and the first service that are received from the respective first service providing devices 20-1 and advertising information piece for the second service, in other words, the advertising information piece to be provided to users of the second service by the second service providing device 20-2.

Additionally, before receiving a processing request for a first service, each of the one or more first service providing devices 20-1 may transmit a first merged terms of use agreement to the second service providing device 20-2. Here, the first merged terms of use agreement is generated by merging: (i) the terms of use agreement for the first service; and (ii) the terms of use agreements for the different services received from the different service providing devices 30. In this case, the second service providing device 20-2 may accept a processing request for the second service, provided that the second service providing device 20-2 is to comply the first merged terms of use agreement.

In addition, the second service providing device 20-2 may generate a second merged terms of use agreement by further merging the first merged terms of use agreement with a terms of use agreement for the second service. In this case, the second service providing device 20-2 may accept a processing request for the second service, provided that the second service providing device 20-2 is to comply the second merged terms of use agreement.

Alternatively, if the service providing system 10 includes multiple first service providing devices 20-1, the second service providing device 20-2 may select such a first service providing device 20-1 that transmits a terms of use agreement with which the second service providing device 20-2 is to comply. In this case, the second service providing device 20-2 may transmit a processing request for the first service to the selected first service providing device 20-1. Optionally, the second service providing device 20-2 can also accept a processing request for the second service provided that the second service providing device 20-2 can output, to the second service user's terminal, the advertising information pieces related to the first, second and different services under the corresponding output conditions, respectively.

In the service providing system 10 described above, each first service providing device 20-1 transmits, to the second service providing device 20-2, advertising information to be provided to first service users, while the second service providing device 20-2 provides second service users with advertising information on first services received from the first service providing devices 20-1. This allows the service providing system 10 as described above to provide a new service by appropriately using different services, and to propagate, to the new service provider, advertising information and terms of use agreements to be provided to users of the different services.

Figure 7:
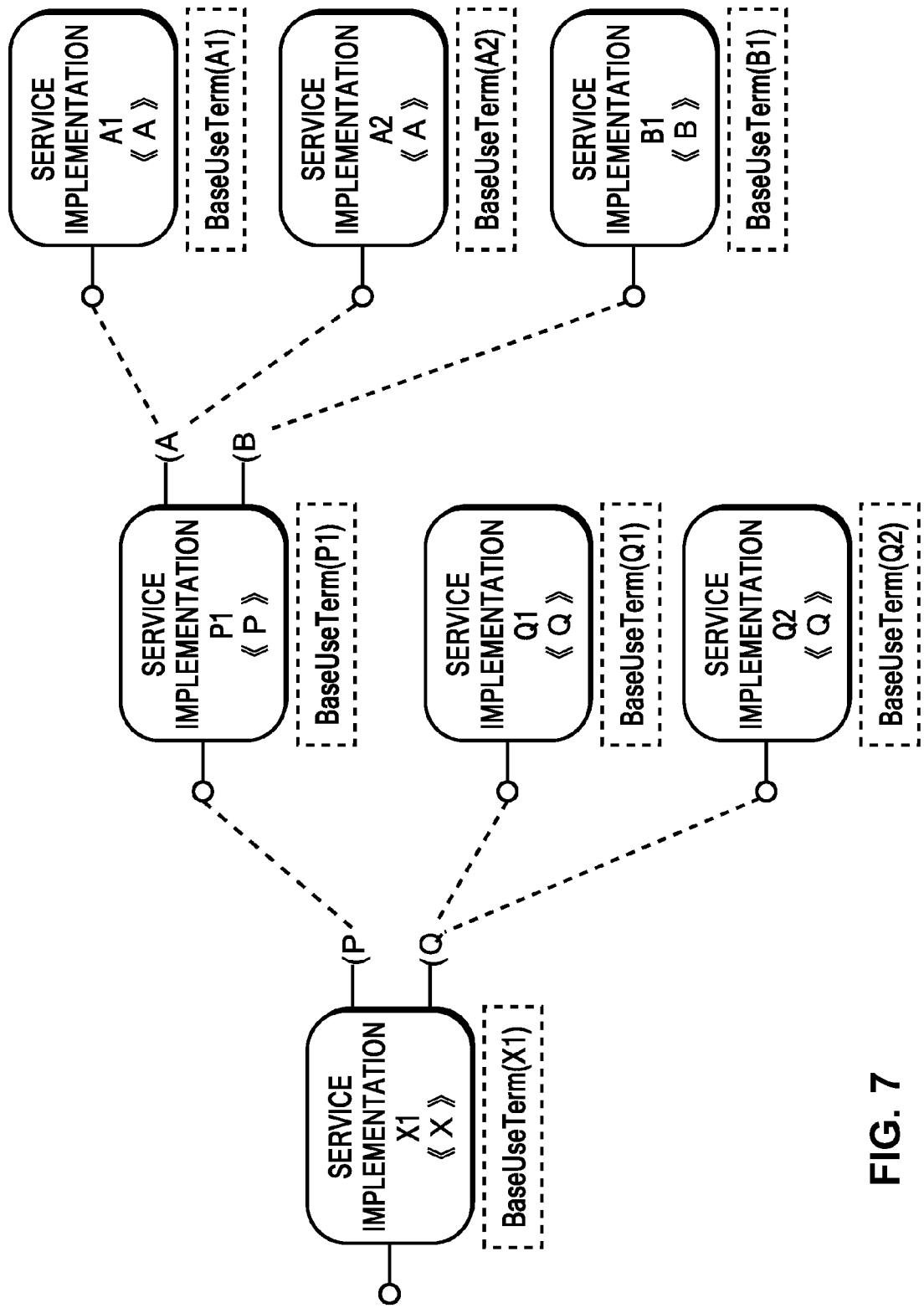
FIG. 7 shows an example of a usage relationship between services implemented by the service providing system according to the embodiment of the present invention.

FIG. 7 shows an example of a usage relationship between services implemented by the service providing system 10 according to this embodiment. In the example shown in FIG. 7, Service Implementation X1 represents a service providing device that implements a service X. Similarly, Service Implementation P1 represents a service providing device that implements a service P; Service Implementations Q1 and Q2 each represents a service providing device that implements a service Q; Service Implementations A1 and A2 each represents a service providing device that implements a service A; and Service Implementation B1 represents a service providing device that implements a service B.

In addition, in this example, the service X uses the services P and Q. Thus, the relationship between Service Implementation X1 and Service Implementations P1, Q1 and Q2 is equivalent to the relationship between the service providing device 20 and the different service providing devices 30. Service Implementation X1 selects either of Service Implementations Q1 and Q2 to use the service Q.

Meanwhile, in this example, the service P uses the services A and B. Thus, the relationship between Service Implementation P1 and Service Implementations A1, A2 and B1 is equivalent to the relationship between the service providing device 20 and the different service providing devices 30, as well. Service Implementation P1 selects either of Service Implementations A1 and A2 to use the service A.

Here, the merged terms of use agreement generated by Service Implementation X1 is represented by the following Equation 1, shown below. In the following expressions, BaseUseTerm(X1) represents a terms of use agreement presented by Service Implementation X1 itself (that is, a terms of use agreement requested by the provider of Service Implementation X1). UseTerm(P) represents a terms of use agreement for the service P while UseTerm(Q) represents a terms of use agreement for the service Q. Note that, in the following expressions, "AND" represents logical conjunction and "OR" represents logical disjunction.

$$UseTerm(X1) = BaseUseTerm(X1) \text{ AND } UseTerm(P) \text{ AND } UseTerm(Q) \tag{1}$$

[Equation 1]

The service X selects either of Service Implementations Q1 and Q2 to use the service Q. Accordingly, the terms of use agreement for the service Q is expressed by the following Equation 2.

$$UseTerm(Q1) = UseTerm(Q1) \text{ OR } UseTerm(Q2) \tag{2}$$

[Equation 2]

By using the expressions (1) and (2), the merged terms of use agreement generated by Service Implementation X1 is expressed by the following Equation 3.

$$UseTerm(X1) = BaseUseTerm(X1) \text{ AND } UseTerm(P) \text{ AND}(UseTerm(Q1) \text{ OR } UseTerm(Q2)) \tag{3}$$

[Equation 3]

Meanwhile, the merged terms of use agreement generated by Service Implementation P1 is expressed by the following Equation 4. Note that, in the following expressions, BaseUseTerm(P1) represents a terms of use agreement presented by Service Implementation P1 itself, while UseTerm(A) and UseTerm(B) represent terms of use agreements for the services A and B, respectively.

$$UseTerm(P1) = BaseUseTerm(P1) \text{ AND } UseTerm(A) \text{ AND } UseTerm(B) \tag{4}$$

[Equation 4]

The service P selects either of Service Implementations A1 and A2 to use the service A. Accordingly, the terms of use agreement for the service A is expressed by the following Equation 5.

$$UseTerm(P1) = BaseUseTerm(P1) \text{ AND } (UseTerm(A1) \text{ OR } UseTerm(A2)) \text{ AND } UseTerm(B1) \tag{5}$$

[Equation 5]

Here, the services Q, A and B use no different service, and thus, the terms of use agreements presented by Service Implementations that provide these services Q, A and B are expressed as follows.

$$UseTerm(Q1) = BaseUseTerm(Q1)$$

$$UseTerm(Q2) = BaseUseTerm(Q2)$$

$$UseTerm(A1) = BaseUseTerm(A1)$$

$$UseTerm(A2) = BaseUseTerm(A2)$$

$$UseTerm(B1) = BaseUseTerm(B1) \qquad \text{[Equation 6]}$$

Now, the merged terms of use agreement generated by Service Implementation X1 is expressed by the following Equation 7.

$$UseTerm(X1) =$$

(BaseUseTerm(X1) AND BaseUseTerm(P1) BaseUseTerm(A1) AND BaseUseTerm(B1) AND BaseUseTerm(Q1))

or (BaseUseTerm(X1) AND BaseUseTerm(P1) BaseUseTerm(A1) AND BaseUseTerm(B1) AND BaseUseTerm(Q2))

or (BaseUseTerm(X1) AND BaseUseTerm(P1) BaseUseTerm(A2) AND BaseUseTerm(B1) AND BaseUseTerm(Q1))

or (BaseUseTerm(X1) AND BaseUseTerm(P1) BaseUseTerm(A2) AND BaseUseTerm(B1) AND BaseUseTerm(Q2)) (7)

[Equation 7]

The above expressions will be summarized as follows. Specifically, assume that: UseTerm(S) represents a merged terms of use agreement generated by the service providing device 20 that provides a certain service S; UseTerm($SS_i$) represents a terms of use agreement for each different service $SS_i$ used by the service S (that is, a terms of use agreement received by the additional information receiving unit 56); and BaseUseTerm(S) represents a terms of use agreement presented by the service providing device 20 itself (that is, a terms of use agreement stored in the additional information storage unit 54). In this case, the merged terms of use agreement for the service S implemented by the service providing device 20 is expressed by the following Equation 8. Note that i denotes a positive integer.

$$UseTerm(S) = BaseUseTerm(S) \text{ AND } UseTerm(SS_1) \text{ AND} \ldots \text{ AND } UseTerm(SS_n) \tag{8}$$

[Equation 8]

Moreover, in the case where two or more different service providing devices 30 implement the same different service $SS_i$, assume that UseTerm($SS_{ij}$) represents a terms of use agreement for the different service $SS_i$ implemented by each different service providing device 30. In this case, the terms of use agreement UseTerm($SS_i$) on the different service $SS_i$ in the Equation 8 is expressed by the following Equation 9. Note that j denotes a positive integer.

$$UseTerm(SS_i) = UseTerm(SS_{i1}) \text{ OR} \ldots \text{ OR } UseTerm(SS_{in})) \tag{9}$$

[Equation 9]

Accordingly, by using the Equations 8 and 9, the merged terms of use agreement generated by Service Implementation X1 is expressed by the following Equation 10.

$$UseTerm(S) = BaseUseTerm(S) \wedge \Sigma \cdot \{UseTerm(SS_{1i_1}) \vee \ldots \vee UseTerm(SS_{ni_n}) | i_j \in M_j, j=1 \ldots N\} \tag{10}$$

[Equation 10]

Note that "∧" represents logical conjunction (AND) and "∨" represents logical disjunction (OR).

As shown by the above expressions, the additional information receiving unit 56 receives terms of use agreements for different services respectively from two or more different service providing devices 30 before the request transmitting unit 50 transmits different processing request messages to the respective different service providing devices 30. Then, the generating unit 58 generates a merged terms of use agreement by calculating the logical conjunction of: (i) a terms of use agreement for the service provided by the service providing device 20 and stored in the additional information storage unit 54; and (ii) the logical disjunction of two or more terms of use agreements for the respective different services that is received by the additional information receiving unit 56 from the respective two or more different service providing devices 30. This allows the generating unit 58 to generate an appropriately-merged terms of use agreement.

As described above, in the service providing system 10 according to this embodiment, each device that provides a service by using one or more different services can generate a merged terms of use agreement by merging terms of use agreements for the services to be used before receiving a request for its own service. Thus, each device in the service providing system 10 can provide the merged terms of use agreement to users of the concerned service, or use as a condition for acceptance of a service request. This allows the service providing system 10 to properly provide the concerned service while complying with the terms of use agreements for the services that the system 10 uses.

Figure 8:
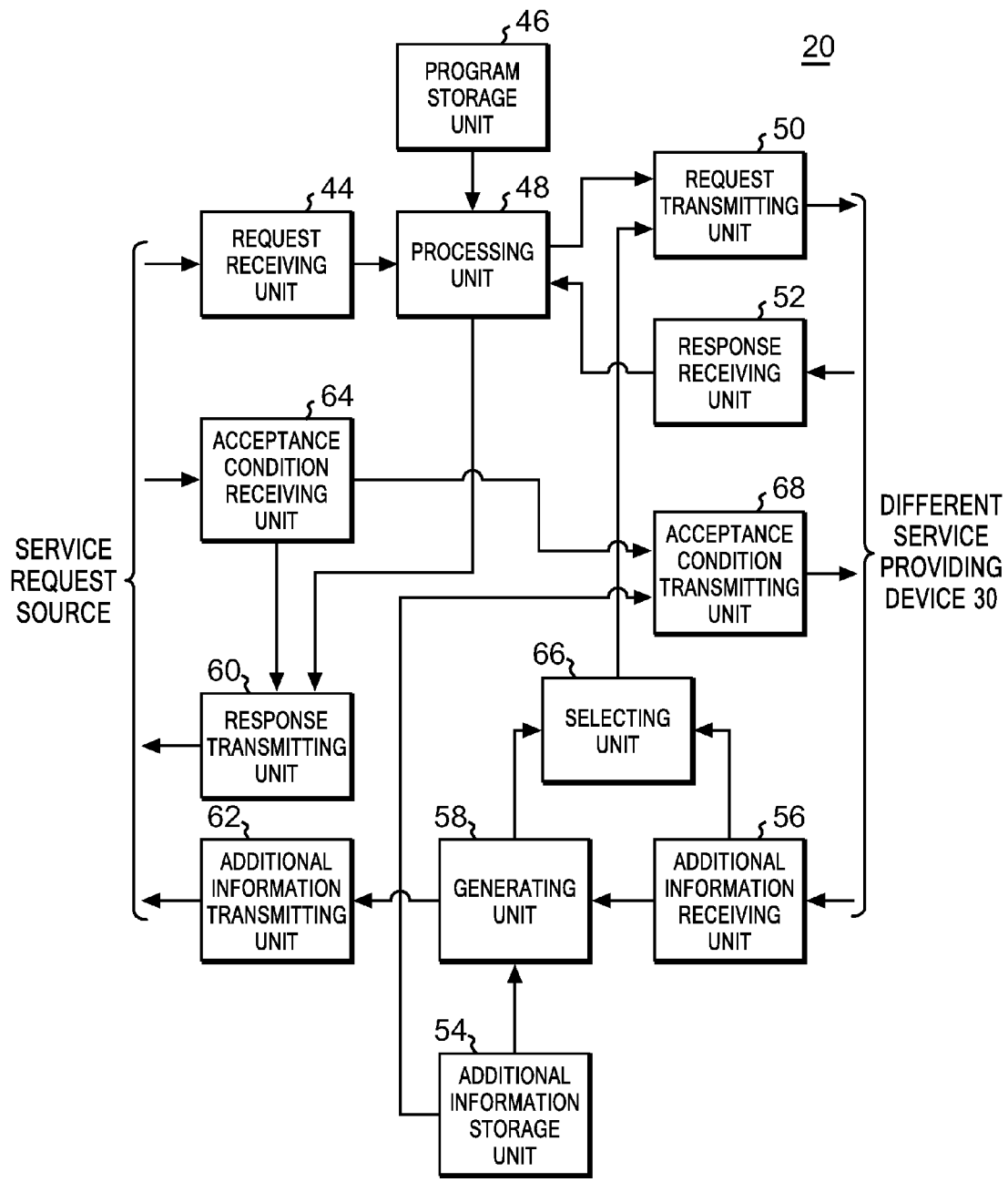
FIG. 8 shows a configuration of the service providing device according to a modification of the embodiment of the present invention.

FIG. 8 shows a configuration of the service providing device 20 according to a modification of this embodiment. The service providing device 20 according to this modification has approximately the same configuration and functions as those of the service providing device 20 shown in FIG. 2. Accordingly, components having the same configuration and functions as those of the components shown in FIG. 2 are denoted by the same reference numerals, and description thereof will be omitted, except that of differences from FIG. 2.

The service providing device 20 according to this modification further includes an acceptance condition receiving unit 64. The acceptance condition receiving unit 64 receives an acceptable terms of use agreement from a service request source. The acceptable terms of use agreement consists of terms of use to which the service request source agrees. In this case, the response transmitting unit 60 transmits back a processing result of a service to the service request source, provided that a merged terms of use agreement for the service is to comply the acceptable terms of use agreement. Here, consider the case where two or more different service providing devices 30 provide the same different service. In this case, the response transmitting unit 60 transmits back, to the service request source, a processing result of the service provided by one of the two or more different service providing devices 30 that presents a terms of use agreement satisfying the acceptable terms of use agreement. This allows the service providing device 20 according to this modification to provide a new service by using one or more different services acceptable to the service request source.

Moreover, consider the case where the service providing device 20 displays a graphical interface screen on the user's terminal to allow the user to input information on the screen, and thereby provides a service corresponding to the information inputted by the user. In this case, the acceptance condition receiving unit 64 may receive an acceptable terms of use agreement based on the information (the user's age, for example) inputted by the user. This allows the acceptance condition receiving unit 64 to cause the service providing device 20 to transmit back, to each user, advertising information appropriate for the user.

Moreover, the service providing device 20 according to this modification may further include an acceptance condition transmitting unit 68 in addition to the acceptance condition receiving unit 64. The acceptance condition transmitting unit 68 transmits, to a lower-level different service providing device 30, an acceptable terms of use agreement that the acceptance condition receiving unit 64 receives from the service request source. In addition, the acceptance condition transmitting unit 68 may also transmit, to a lower-level different service providing device 30, a terms of use agreement for the service provided by the service providing device 20, as an acceptance condition.

Moreover, the service providing device 20 according to this modification may further include a selecting unit 66 in place of or in addition to the acceptance condition receiving unit 64. If the service providing device 20 includes the selecting unit 66, the additional information receiving unit 56 receives terms of use agreements including output conditions from two or more different service providing devices 30 that provide different services, respectively, before the request transmitting unit 50 transmits different processing request messages to the respective different service providing devices 30.

From the two or more different service providing devices 30, the selecting unit 66 selects one different service providing device 30 that transmits output conditions with which the service providing device 20 can comply. In this case, the generating unit 58 can generate screen data for outputting the advertising information related to the different service under the above output conditions. Then, the request transmitting unit 50 transmits a different processing request message to the different service providing device 30 that the selecting unit 66 selects.

Consider the case where the selecting unit 66 receives, from the two or more different service providing devices 30, terms of use agreements including output conditions that the corresponding advertising information pieces should be displayed on the same area of the screen as one another. In this case, the selecting unit 66 selects one from these different service providing devices 30, and, at the same time, selects other different service providing devices 30 that provide the same services as those of the different service providing devices 30 that the selecting unit 66 does not select. Furthermore, consider the case where the selecting unit 66 receives, from the two or more different service providing devices 30, terms of use agreements each including output conditions that the advertising information should be outputted as a sound. In this case, the selecting unit 66 selects one from these different service providing devices 30. If, however, each of the two or more different service providing devices 30 presents output conditions that the sound of its own service be outputted together with those of other services at different times from one another, the selecting unit 66 may select all these different service providing devices 30. In this case, the generating unit 58 outputs the two or more sounds received respectively from the two or more different service providing devices 30, for example, by periodically switching between the sounds.

Moreover, if two or more different service providing devices 30 provide the same service, the selecting unit 66 may select, from these different service providing devices 30, one that will put the lightest processing load on the user's terminal. For example, the selecting unit 66 may select one different service providing device 30 that provides advertising information to be displayed with the smallest size on the screen of the user's terminal. Alternatively, the selecting unit 66 may select one different service providing device 30 that provides advertising information having the smallest data size. Still alternatively, in accordance with a data type (such as video or still image data) of the advertising information, the selecting unit 66 may select one different service providing device 30 that will put the lightest processing load on the user's terminal. Also, consider the case where the selecting unit 66 is given output conditions that the corresponding advertising information should be displayed for at least a predetermined time, and output conditions that the corresponding advertising information should be displayed for a predetermined time on a best-effort basis. In this case, the selecting unit 66 may select the different service providing device 30 that presents the output conditions that the corresponding advertising information should be displayed for a predetermined time on a best-effort basis.

Figure 9:
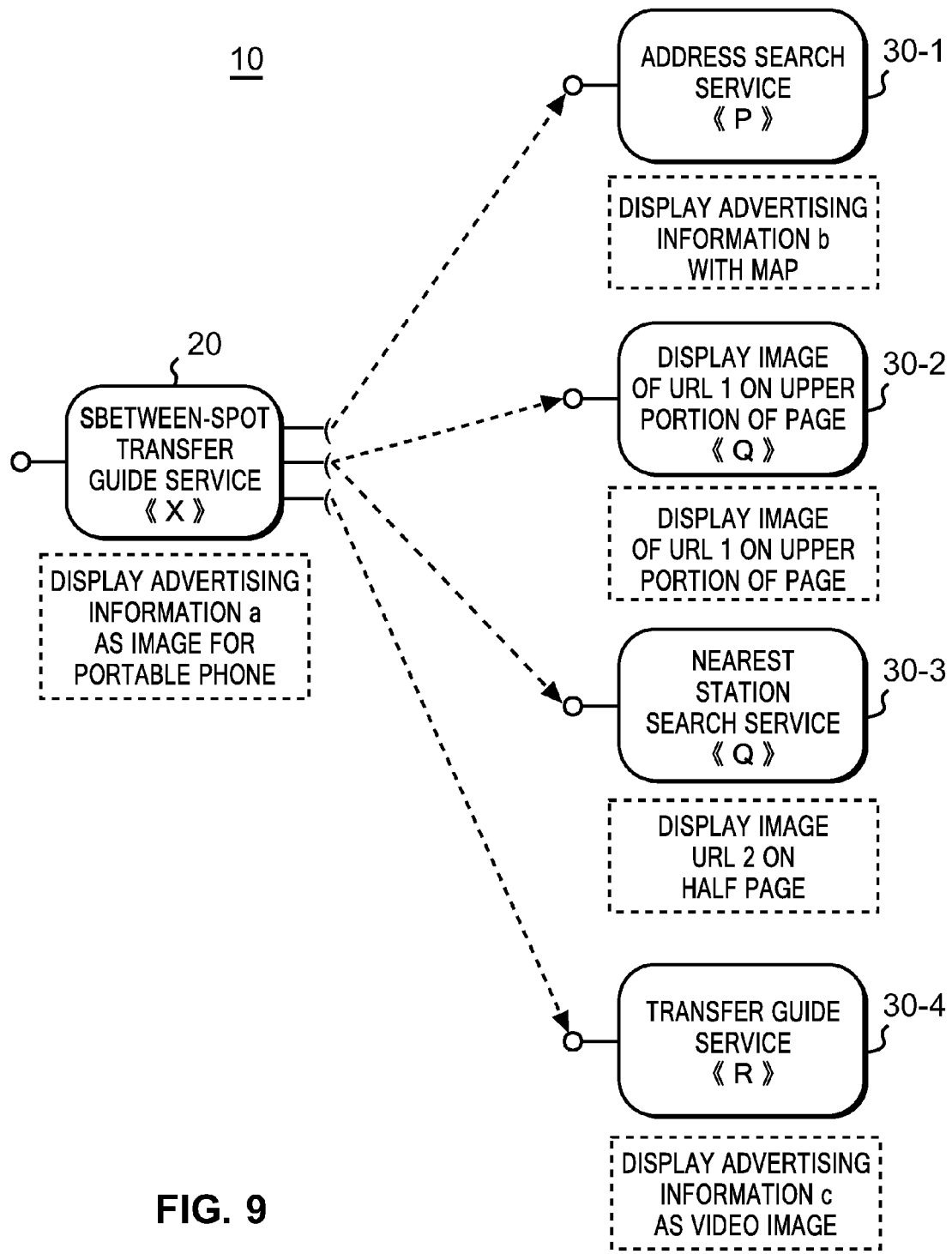
FIG. 9 shows an example of a specific service implemented by the service providing system according to the embodiment of the present invention.

FIG. 9 shows an example of a specific service implemented by the service providing system 10 according to this embodiment. In the example shown in FIG. 9, the service providing device 20 implements a between-spot transfer guide service (X). The between-spot transfer guide service (X) uses an address search service (P), a nearest station search service (Q) and a transfer guide service (R).

In the example shown in FIG. 9, the address search service (P) is implemented by a first different service providing device 30-1. The nearest station search service (Q) is implemented by each of second and third different service providing devices 30-2 and 30-3. The transfer guide service (R) is implemented by a fourth different service providing device 30-4.

The service providing device 20 presents a terms of use agreement specifying that advertising information (a) should be displayed as an image for a portable phone. The first different service providing device 30-1 presents a terms of use agreement specifying that advertising information (b) with a map should be displayed. The second different service providing device 30-2 presents a terms of use agreement specifying that an image of URL 1 should be displayed on an upper portion of a page. The third different service providing device 30-3 presents a terms of use agreement specifying that an image of URL 2 should be displayed on half a page. The fourth different service providing device 30-4 presents a terms of use agreement specifying that advertising information (c) should be displayed as a video image.

Upon receiving a processing request message from a service request source, the service providing device 20 as described above displays, on the user's terminal, a transfer guide from a spot corresponding to the inputted current spot name to a spot corresponding to the inputted destination spot name as a processing result of its own service. In addition, the service providing device 20 also displays, on the user's terminal, either an image including: advertising information (a) to (c); and an image of URL 1 located on an upper portion of the page, or an image including: advertising information (a) to (c(; and an image of URL 2 located on half the page.

Figure 10:
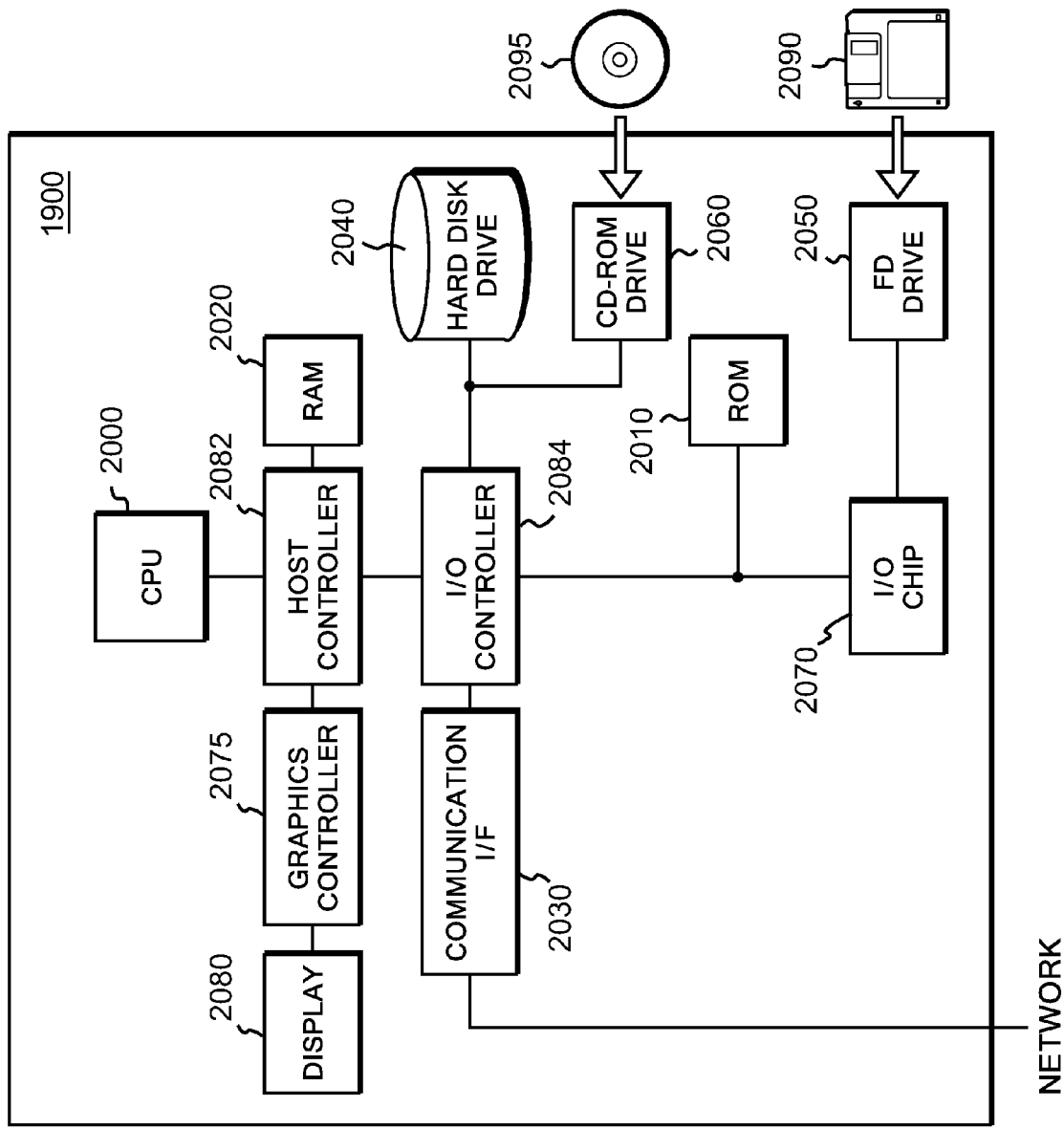
FIG. 10 shows an example of a hardware configuration of a computer according to the embodiment of the present invention.

FIG. 10 shows an example of a hardware configuration of a computer 1900 according to the embodiment. The computer 1900 includes a CPU peripheral unit, an input/output unit and a legacy input/output unit. The CPU peripheral unit includes a CPU 2000, a RAM 2020, a graphics controller 2075 and a display 2080, which are connected to one another by a host controller 2082. The input/output unit includes a communication interface 2030, a hard disk drive 2040, and a CD-ROM drive 2060, which are connected to the host controller 2082 by an input/output controller 2084. The legacy input/output unit includes a ROM 2010, a flexible disk drive 2050, and an input/output chip 2070, which are connected to the input/output controller 2084.

The host controller 2082 connects the RAM 2020 with the CPU 2000 and the graphics controller 2075, which access the RAM 2020 at a high transfer rate. The CPU 2000 operates based on a program stored in the ROM 2010 and the RAM 2020, and controls the foregoing units. The graphics controller 2075 obtains image data generated by the CPU 2000 and the like on a frame buffer provided in the RAM 2020, and causes a display 2080 to display the data. Alternatively, the graphics controller 2075 may contain the frame buffer for storing image data generated by the CPU 2000 and the like therein.

The input/output controller 2084 connects the host controller 2082 with relatively high-speed input/output devices, that is, the communication interface 2030, the hard disk drive 2040 and the CD-ROM drive 2060. The communication interface 2030 communicates with external devices through a network. The hard disk drive 2040 stores therein programs and data which are used by the CPU 2000 in the computer 1900. The CD-ROM drive 2060 reads out programs or data from a CD-ROM 2095, and provides them to the hard disk drive 2040 via the RAM 2020.

Additionally, the input/output controller 2084 also connects the ROM 2010 with relatively low-speed input/output devices, that is, the flexible disk drive 2050 and the input/output chip 2070. The ROM 2010 stores therein a boot program, which is executed during the computer 1900's start-up process, and/or programs including a program dependent on the hardware of the computer 1900. The flexible disk drive 2050 reads out programs or data from a flexible disk 2090, and provides them to the hard disk drive 2040 via the RAM 2020. The input/output chip 2070 not only connects the flexible disk drive 2050 to the input/output controller 2084 but also connects various input/output devices to the input/output controller 2084 via a parallel port, a serial port, a keyboard port, a mouse port and the like.

Each program provided to the hard disk drive 2040 via the RAM 2020 is provided by a user in a form of being stored in a recording medium such as the flexible disk 2090, the CD-ROM 2095, an IC card or the like. Each program is executed by the CPU 2000 after being read out from the recording medium and being installed into the hard disk drive 2040 in the computer 1900.

The program installed on the computer 1900 to cause the computer 1900 to function as the service providing device 20 includes a request receiving module, a program storage module, a processing module, a request transmitting module, a response receiving module, an additional information storage module, an additional information receiving module, a generating module, a response transmitting module, an additional information transmitting module, an acceptance condition receiving unit and a selecting module. The program and the modules described above control the CPU 2000 or the like so that the computer 1900 can function as the request receiving unit 44, the program storage unit 46, the processing unit 48, the request transmitting unit 50, the response receiving unit 52, the additional information storage unit 54, the additional information receiving unit 56, the generating unit 58, the response transmitting unit 60, the additional information transmitting unit 62, the acceptance condition receiving unit 64 and the selecting unit 66.

When loaded onto the computer 1900, the above information processing program functions as specific means implemented through cooperation between the software and the aforementioned hardware resources. That is, the above information processing program functions as the request receiving unit 44, the program storage unit 46, the processing unit 48, the request transmitting unit 50, the response receiving unit 52, the additional information storage unit 54, the additional information receiving unit 56, the generating unit 58, the response transmitting unit 60, the additional information transmitting unit 62, the acceptance condition receiving unit 64 and the selecting unit 66. Moreover, it is possible to develop the service providing device 20 customized in accordance with an intended use of the computer 1900 in this embodiment by implementing computation and processing of information in accordance with the intended use by using these specific means.

For example, when the computer 1900 communicates with an external device and the like, the CPU 2000 executes a communication program loaded on the RAM 2020, and instructs the communication interface 2030 to perform communication processing based on the processing contents described in the communication program. Under the control of the CPU 2000, the communication interface 2030 performs a read operation or a write operation as follows. In the read operation, the communication interface 2030 reads out transmission-target data stored in a transmission buffer region or the like provided on a storage such as the RAM 2020, the hard disk drive 2040, the flexible disk 2090 or the CD-ROM 2095, and transmits the transmission-target data through the network. Meanwhile, in the write operation, the communication interface 2030 writes data received through the network into a reception buffer region or the like provided on the storage. As described above, the communication interface 2030 may forward or receive data to be exchanged to/from the storage by using a direct memory access (DMA) method. Alternatively, the CPU 2000 may read out data from the storage or the communication interface 2030 of a forwarding-source device, and then write the data into the storage or the communication interface 2030 of a forwarding-destination spot device so that data to be exchanged can be forwarded between the devices.

In addition, the CPU 2000 loads, onto the RAM 2020, all or necessary data stored in files, a database or the like in an external storage such as the hard disk drive 2040, the CD-ROM drive 2060 (the CD-ROM 2095) or the flexible disk drive 2050 (the flexible disk 2090) by DMA forwarding or the like, and thereby performs various processing on the data on the RAM 2020. Then, the CPU 2000 rewrites the external storage with the processed data by DMA forwarding or the like. In the above processing, the RAM 2020 can be considered as a temporary storage for data read out from the external storage. Thus, storages such as the RAM 2020 and the external storage are collectively referred to as a memory, a storage unit or a storage in this embodiment. Various information, such as, various programs, data, tables and databases, in this embodiment are stored in the above storage, and regarded as information processing targets. Note that the CPU 2000 may retain part of the RAM 2020 in a cache memory, and write or read out data into/from the cache memory. Even if this form is employed, the cache memory performs part of functions of the RAM 2020. Thus, the cache memory is also included in the RAM 2020, the memory and/or the external storage in this embodiment, unless the cache memory is described as a distinct unit from these.

In addition, the CPU 2000 performs, on data read out from the RAM 2020, various processing such as various computations, information processing, conditional decision, information search and replacement, and rewrites the RAM 2020 with the processed data. For example, if the CPU 2000 performs the conditional decision on the data, the CPU 2000 firstly determines whether or not each of various variables shown in this embodiment satisfies a condition that the variable be larger, smaller, not smaller than, not larger than, or equal to another variable or constant. Then, the CPU 2000 branches to a different sequence of instructions or calls a subroutine if the concerned variable satisfies (or does not satisfy) the condition.

In addition, the CPU 2000 is capable of retrieving information stored in files, a database or the like in the storage. For example, consider the case where the storage stores therein multiple entries in each of which a first attribute value is associated with a second attribute value. In this case, the CPU 2000 searches the storage to find out one or more entries satisfying a condition that specifies one or more first attribute values, from the multiple entries stored in the storage, and then reads out one or more second attributes stored in the entries. Thereby, the CPU 2000 can obtain the second attribute values associated with the first attribute values that satisfy the predetermined condition.

The programs and modules as described above may be stored in an external recording medium. The external recording medium used here may be the flexible disk 2090 or the CD-ROM 2095, or alternatively may be: an optical recording medium such as DVD or CD; a magneto-optical medium such as MO; a tape medium; or a semiconductor memory such as an IC card. Still alternatively, the external recording medium used here may be a storage such as a hard disk or a RAM provided in a server system connected to a dedicated communication network or the Internet. In this case, the programs are provided to the computer 1900 through the network.

The present invention has been described by using the embodiment but the technical scope of the present invention is not limited to what is described in the above embodiment. It will be apparent to those skilled in the art that the above embodiment can be modified or improved in various ways. It will be apparent from the description of the scope of the claims that such other modified or improved embodiments are also included in the technical scope of the present invention.

What is claimed is:

1. A device for providing a service, the device comprising:
a request receiving unit for receiving a processing request message for the service from a service request source;
a processing unit for processing the service according to the processing request message;
a request transmitting unit for transmitting, during the processing of the service, a different processing request message for a different service to a different service providing device, wherein the different service is used by the service to be provided to the service request source;
a response receiving unit for receiving a processing result of the different service from the different service providing device;
an additional information receiving unit for receiving an additional information piece from the different service providing device, wherein the additional information piece includes a terms of use agreement for the different service;
a response transmitting unit for transmitting back to the service request source a processing result of the service;
an additional information transmitting unit for transmitting to the service request source the additional information piece received from the different service providing device;
an additional information storage unit for storing a terms of use agreement for the service provided by the service providing device; and
a generating unit for generating a merged terms of use agreement by merging: (i) the terms of use agreement for the service provided by the service providing device and stored in the additional information storage unit and (ii) the terms of use agreement for the different service provided by the different service providing device and received by the additional information receiving unit.

2. The device of claim 1, further comprising:
a generating unit for generating screen data that includes the additional information piece;
wherein the screen data is used for displaying a screen on a terminal of a user of the service; and
wherein the additional information transmitting unit transmits back the screen data to the service request source.

3. The device of claim 2, wherein the additional information receiving unit receives from the different service providing device: (i) an advertising information if provided by the different service providing device, and (ii) the terms of use agreement if provided by the different service providing device;
  wherein the terms of use agreement includes an output condition under which the advertising information is outputted to the terminal; and
  wherein the generating unit generates the screen data for outputting the advertising information to the terminal under the output condition.

4. The device of claim 3, wherein the output condition includes at least one of: (i) a condition that respectively specifies a position, a size, a time and a frequency of displaying the advertising information on the terminal as an image and (ii) a condition that respectively specifies a time, a sound volume and a frequency of outputting the advertising information to the terminal as a sound.

5. The device of claim 4, wherein:
  the request transmitting unit transmits a plurality of the different processing request messages for a plurality of the corresponding different services to a plurality of the corresponding different service providing devices that process the plurality of corresponding different services;
  the response receiving unit receives a plurality of processing results of the respective plurality of different services;
  the additional information receiving unit receives, with each of the plurality of different services, (i) at least one advertising information piece provided by the corresponding different service providing device and (ii) at least one terms of use agreement, wherein the terms of use agreement includes the output condition specifying how to output the advertising information piece to the terminal; and
  the generating unit generates the screen data for outputting all the advertising information pieces to the terminal under respective corresponding output conditions included in each terms of use agreement.

6. The device of claim 3, further comprising:
  a selecting unit for selecting one different service providing device from two or more of the different service providing devices;
  wherein the one different service providing device transmits the output condition with which the generating unit can generate screen data for outputting the advertising information related to the different service;
  wherein the additional information receiving unit receives the terms of use agreement including the output condition from each of the different service providing devices and before the request transmitting unit transmits the different processing request message to any of the two or more different service providing devices; and
  wherein the request transmitting unit transmits the different processing request message to the different service providing device that the selecting unit selects.

7. The device of claim 3, further comprising:
  an additional information storage unit for storing: (i) an advertising information piece that the service providing device is to provide to a user and (ii) a terms of use agreement including an output condition under which the advertising information piece is outputted to the terminal;
  wherein the generating unit generates screen data for outputting, to the terminal, the advertising information piece received from the different service providing device and the advertising information piece stored in the additional information storage unit and generates screen data in a way that the respective corresponding output conditions are satisfied.

8. The device of claim 1, further comprising:
  an acceptance condition receiving unit for receiving an acceptable terms of use agreement, which is a terms of use agreement to which the service request source agrees, from the service request source;
  wherein the response transmitting unit transmits back the processing result of the service to be provided to the service request source to the service request source as long as the merged terms of use agreement for the service complies with the acceptable terms of use agreement.

9. The device of claim 1, wherein:
  the additional information receiving unit receives, from each of the different service providing devices and before the request transmitting unit transmits the different processing request message to any of two or more different service providing devices, the terms of use agreement for the corresponding different service; and
  the generating unit generates the merged terms of use agreement by calculating (i) a logical conjunction of terms of use agreement for the service that is provided by the service providing device and the terms of use agreement that is stored in the additional information storage unit, and (ii) the logical disjunction of the two or more terms of use agreements for the different services that the additional information receiving unit received from the two or more different service providing devices.

10. The device of claim 1, further comprising:
a program storage unit for storing a service providing program for processing the service;
an additional information storage unit for storing an additional information piece on the service providing device, wherein the information piece includes at least one of: (i) an advertising information piece that the service providing device is to provide to a user, and (ii) a terms of use agreement for the service provided by the service providing device; and
a generating unit for generating a merged terms of use agreement by merging: (i) the additional information on the service providing device read out from the additional information storage unit, and (ii) the additional information on the different service providing device received by the additional information receiving unit;
wherein the processing unit reads out, from the program storage unit, the service providing program for processing the service specified by the processing request message, and executes the read-out program;
wherein the request transmitting unit transmits the different processing request message to the different service providing device, if the processing unit executes a calling process in the service providing program to call the different service; and
wherein the additional information transmitting unit transmits the merged additional information to the service request source.

11. A method for providing a service by a service providing device, the method comprising the steps of:
receiving, by a request receiving unit, a processing request message for the service from a service request source computer;
processing, by a processing unit, the service according to the processing request message;
transmitting, by a request transmitting unit, a different processing request message for a different service to a different service providing device, wherein the transmitting is during the processing of the service by the processing unit and wherein the different service is used by the service to be provided to the service request source;

receiving, by a response receiving unit, a processing result of the different service from the different service providing device;

receiving, by an additional information receiving unit and from the different service providing device, an additional information piece including a terms of use agreement for the different service;

transmitting, by a response transmitting unit, back the processing result of the service to the service request source;

transmitting, by an additional information transmitting unit and to the service request source, the additional information piece received from the different service providing device;

storing, by an additional information storage unit, a terms of use agreement for the service provided by the service providing device; and generating, by a generating unit, a merged terms of use agreement by merging: (i) the terms of use agreement for the service provided by the service providing device and stored in the additional information storage unit and (ii) the terms of use agreement for the different service provided by the different service providing device and received by the additional information receiving unit.

12. A system for providing a service, the system comprising:
a first service providing device for processing a first service upon receipt of a processing request for the first service, and for transmitting back a processing result of the service to a request source;
a second service providing device for requesting the first service providing device to process the first service and processing a second service which uses the first service when the second service providing device receives a processing request for the second service; and
a plurality of the first service providing devices; wherein, before receiving the processing request for the first service, each of the plurality of first service providing devices transmits, to the second service providing device, a terms of use agreement for the first service in the first service providing device; and wherein the second service providing device selects, from the plurality of first service providing devices, such a first service providing device that transmits a terms of use agreement with which the second service providing device is to comply, and transmits a processing request for the first service to the selected first service providing device;
wherein the first service providing device transmits a terms of use agreement for the first service to the second service providing device before receiving the processing request for the first service;
wherein the second service device accepts the processing request for the second service, provided the second service complies with the terms of use of the first service;
wherein the first service providing device transmits, to the second service providing device, an advertising information piece to be provided to a user of the first service;
wherein the second service providing device provides a user of the second service with the advertising information piece related to the first service and received from the first service providing device;
wherein the second service providing device also provides and advertising information piece related to the second service;
wherein the first service providing device (i) request a different service providing device to process a different service that the first service uses while the first service providing device is processing the first service and (ii) transmits, to the second service providing device, an information piece received from the different service providing device to be provided to a user of the different service and the advertising information piece related to the first service;
wherein the second service providing device provides the user of the second service with the advertising information pieces related to the different service and the first and second services, wherein the advertising information pieces related to the different service and the first service are received from the first service providing device; and
wherein first service providing device transmits to the second service providing device, before receiving the processing request for the first service, a first merged terms of use agreement obtained by merging the terms of use agreement for the first service and a terms of use agreement for the different service received from the different service providing device; and the second service providing device accepts the processing request for the second service, provided that the second service providing device complies with the first merged terms of use agreement.

13. The system of claim 12, wherein the second service providing device (i) generates a second merged terms of use agreement by further merging the first merged terms of use agreement with a terms of use agreement for the second service and (ii) accepts a processing request for the second service, provided that the second service providing device complies with the second merged terms of use agreement.

14. The system of claim 13, wherein:
the terms of use agreements for the first, second, and different services include output conditions under which advertising information pieces related to the first, second, and different services, are outputted to a user's terminal; and
the second service providing device accepts the processing request for the second service, provided that the second service providing device can output, to a terminal of users of the second service, the advertising information pieces related to the first, second and different services under the corresponding output conditions, respectively.

15. The system of claim 14, wherein each of the output conditions includes at least one of: (i) conditions respectively specifying a position, a size, a time and a frequency of displaying the advertising information on the terminal as an image; and (ii) conditions respectively specifying a sound volume, a time and a frequency of outputting the advertising information to the terminal as a sound.

16. A computer program product embodying a non-transitory medium including a computer readable code which, when executed, causes a computer to provide a service according to the steps of the method of claim 11.

* * * * *